(12) United States Patent
Chung (10) Patent No.: US 9,060,326 B2
(45) Date of Patent: Jun. 16, 2015

(54) RSS CHANNEL INFORMATION PROVISION METHOD AND SYSTEM AND PORTABLE DEVICE USING THE SAME

(75) Inventor: Hee Jeong Chung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1362 days.

(21) Appl. No.: 12/638,304

(22) Filed: Dec. 15, 2009

(65) Prior Publication Data

US 2010/0153533 A1 Jun. 17, 2010

(30) Foreign Application Priority Data

Dec. 15, 2008 (KR) ........................ 10-2008-0127077

(51) Int. Cl.

| G06F 15/16 | (2006.01) |
|---|---|
| G06F 15/173 | (2006.01) |
| H04W 48/08 | (2009.01) |
| G06F 17/30 | (2006.01) |
| H04L 29/12 | (2006.01) |
| H04L 29/08 | (2006.01) |
| H04L 12/24 | (2006.01) |
| H04W 48/16 | (2009.01) |
| H04W 88/16 | (2009.01) |
| H04W 88/18 | (2009.01) |

(52) U.S. Cl.
CPC ........... H04W 48/08 (2013.01); H04L 61/1541 (2013.01); H04L 67/16 (2013.01); H04L 41/5058 (2013.01); G06F 17/3089 (2013.01); H04W 48/16 (2013.01); H04W 88/16 (2013.01); H04W 88/18 (2013.01)

(58) Field of Classification Search
CPC .. H04L 41/5058; H04L 67/16; H04L 61/1541
USPC .......... 709/217, 223; 175/738, 739; 715/738, 715/739
See application file for complete search history.

(56) References Cited

U.S. PATENT DOCUMENTS

| 7,702,675 | B1 * | 4/2010 | Khosla et al. ................. 707/710 |
|---|---|---|---|
| 8,010,645 | B2 * | 8/2011 | Shivaji Rao .................. 709/223 |
| 8,020,106 | B2 * | 9/2011 | Diab et al. ..................... 715/760 |
| 2006/0073812 | A1 * | 4/2006 | Punaganti Venkata et al. .......................... 455/412.1 |
| 2011/0320954 | A1 * | 12/2011 | Lawton et al. ................ 715/739 |

* cited by examiner

Primary Examiner — Aaron Strange
(74) Attorney, Agent, or Firm — Cha & Reiter, LLC (57) ABSTRACT

An RSS provision method and system and portable device is provided for facilitating subscription to RSS channels and update of the subscribed RSS channels by providing RSS channels classified as being in the same category as that of a requested RSS channel. The Rich Site Summary (RSS) channel information provision method includes transmitting an RSS channel information request message from a mobile terminal, the RSS channel information request message indicating a target RSS channel; searching a database for addresses of other RSS channels classified as being in the same category as that of the target RSS channel; transmitting, when no address of other RSS channel is found, a second type RSS channel information request message to a web server; transmitting an RSS channel information response message from the web server to the gateway in response to the second type RSS channel information request message, the RSS channel information response message containing information regarding the target RSS channel and other RSS channels classified as being in the same category as that of the target RSS channel; and displaying, at the mobile terminal, the information on the target RSS channel and other RSS channels extracted from the RSS channel response message.

20 Claims, 7 Drawing Sheets

RSS CHANNEL INFORMATION PROVISION METHOD AND SYSTEM AND PORTABLE DEVICE USING THE SAME

CLAIM OF PRIORITY

This application claims the benefit of the earlier filing date, pursuant 25 USC 119, to that patent application entitled "RSS CHANNEL INFORMATION PROVISION METHOD AND SYSTEM AND PORTABLE DEVICE USING THE SAME" filed in the Korean Intellectual Property Office on Dec. 15, 2008 and assigned Serial No. 10-2008-0127077, the contents of which are incorporated herein by reference.

BACKGROUND OF THE INVENTION

1. Field of the Invention

The present invention relates to Really Simple Syndication (RSS) and, in particular, to an RSS provision method and system and portable device for facilitating subscription to RSS channels and update of the subscribed RSS channels.

2. Description of the Related Art

Portable devices, such as cellular telephones, personal digital assistants, etc., are becoming equipped with new and more supplementary functions. For instance, recent mobile devices are equipped with multimedia functions, such as audio and video playback for playing previously stored audio and video files, a camera function for taking still and motion pictures, and an Internet access function for web surfing.

With the advance of Internet technology and network bandwidth, large amounts of data and information may now be exchanged and shared among a plurality of users over the Internet. The rapid expansion of the Internet makes people have an interest in the things happened halfway around the world. In cooperation with the increase of Internet-based information, various types of information and content provision business models have emerged in the market. The information and content provided by the content providers are updated almost in real time, and the user's access of the content providers' website to search and acquire the updated information and contents is almost as rapid. During the information update, however, the users are likely to experience redundant download such that the information acquired already is downloaded again even though the user wants to receive the updated part. The Really Simple Syndication (RSS), or Rich Site Summary, is an XML-based data format for providing the user with frequently updated information such as news headlines and blog entries. Using an RSS application, the user can timely check and download updates by subscribing to an RSS feed without frequent visits to the corresponding website to check the updates, by entering into an RSS application the RSS feed's address.

However, most of the current RSS services designed in consideration of the high processing capability and large display screen of desktop computers is not appropriate for being adapted to capability- and display-constrained portable devices. Since the portable devices are limited in capacity and display and use a relatively costly wireless link for data communication, thus, accessing the RSS services by means of a portable device is restricted and not recommended.

There is, therefore, a need for a method for facilitating the use of RSS services by means of a capacity- and display-constrained portable device.

SUMMARY OF THE INVENTION

In accordance with an exemplary embodiment of the present invention, a Rich Site Summary (RSS) channel information provision method includes transmitting a first type RSS channel information request message requesting information on a selected RSS channel from a mobile terminal to a gateway; searching, at the gateway, a database for addresses of other RSS channels classified as being in the same category as the selected RSS channel; transmitting, when no address of another RSS channel is found, a second type RSS channel information request message from the gateway to a web server; transmitting an RSS channel information response message from the web server to the gateway in response to the second type RSS channel information request message, the RSS channel information response message containing the information on the selected RSS channel and addresses of other RSS channels classified as being in the same category as the selected RSS channel; transmitting the RSS channel response message from the gateway to the mobile terminal; and displaying, at the mobile terminal, the information on the target RSS channel and the addresses of the other RSS channels extracted from the RSS channel response message. The method may further include transmitting, when at least one address of the other RSS channels is found, a first type RSS channel information request message from the gateway to the web server; transmitting an RSS channel information response message from the web server to the gateway in response to the first type RSS channel information request message, the RSS channel information response message containing the information on the selected RSS channel; and transmitting the RSS channel response message with the information on the other RSS channels to the mobile terminal.

In accordance with another exemplary embodiment of the present invention, a Site Summary (RSS) channel information provision method includes selecting, at a mobile terminal, an RSS channel; determining whether the selected RSS channel is included in a channel address information database; transmitting, when the selected RSS channel is not included in the channel address information database, a first type RSS channel information request message requesting for information on the selected RSS channel and addresses of other RSS channels classified as being in the same category as the selected RSS channel to a web server; receiving a first type RSS channel information response message containing the information on the selected RSS channel and the addresses of the other RSS channels from the web server; and displaying the information on the selected RSS channel and the addresses of the other RSS channels that are extracted from the first type RSS channel information response message.

In accordance with another exemplary embodiment of the present invention, a Rich Site Summary (RSS) channel information provision system includes a mobile terminal which transmits a first type RSS channel information request message requesting information on a selected RSS channel; a gateway which receives the first type RSS channel information request message, searches a database for addresses of other RSS channels classified as being in the same category as the selected RSS channel, and transmits, when no address of other RSS channels are found in the database, a second type RSS channel information request message requesting the information on the selected RSS channel and the addresses of the other RSS channels; and a web server which receives the second type RSS channel information request message and transmits an RSS channel information response message to the gateway, the RSS channel information response message containing the information on the selected RSS channel and the addresses of the other RSS channels classified as being in the same category as the selected RSS channel, wherein the gateway forwards the RSS channel information response message to the mobile terminal, and the mobile terminal displays the information on the selected RSS channel and the address of the other RSS channels extracted from the RSS channel information response message. The gateway transmits, when addresses of other RSS channels are found in the database, the first type RSS channel information request message requesting the information on the selected RSS channel, receives the RSS channel information response message containing the information on the selected RSS channel, and transmits the RSS channel information response message with the addresses of other RSS channels to the mobile terminal.

In accordance with still another exemplary embodiment of the present invention, a mobile terminal includes a storage unit which stores a web browser, a Rich Site Summary (RSS) reader for supporting RSS services, an RSS channel list, and an RSS channel address information database; a display unit which displays an execution screen of the RSS reader and the RSS channel list; a input unit which generates an input signal for selecting an RSS channel; a control unit which creates, when the selected RSS channel is included in the channel address information database, a first RSS channel information request message requesting information on a selected RSS channel and addresses of other RSS channels classified as being in the same category as that of the selected RSS channel; and a radio frequency unit which transmits the first type RSS channel information request message to a web server.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The following description is directed to a mobile communication terminal. However, the present invention is not limited to such terminal, but is applicable to various types of portable devices. For instance, the RSS channel information provision method and system of the present invention can be applied to any of a cellular phone, a Personal Digital Assistant (PDA), a smart phone, a Universal Mobile Telecommunication Service (UMTS) terminal, a digital broadcast receiver, and equivalent devices equipped with a RSS reader application and supporting Internet access.

In the following description, the term "RSS channel information" denotes the information updated at a web server having the address of an RSS channel subscribed by the portable device and can include text, image, and audio data. Also, the term "RSS channel address information" denotes the address of the RSS channel of the web server providing the RSS service.

Figure 1:
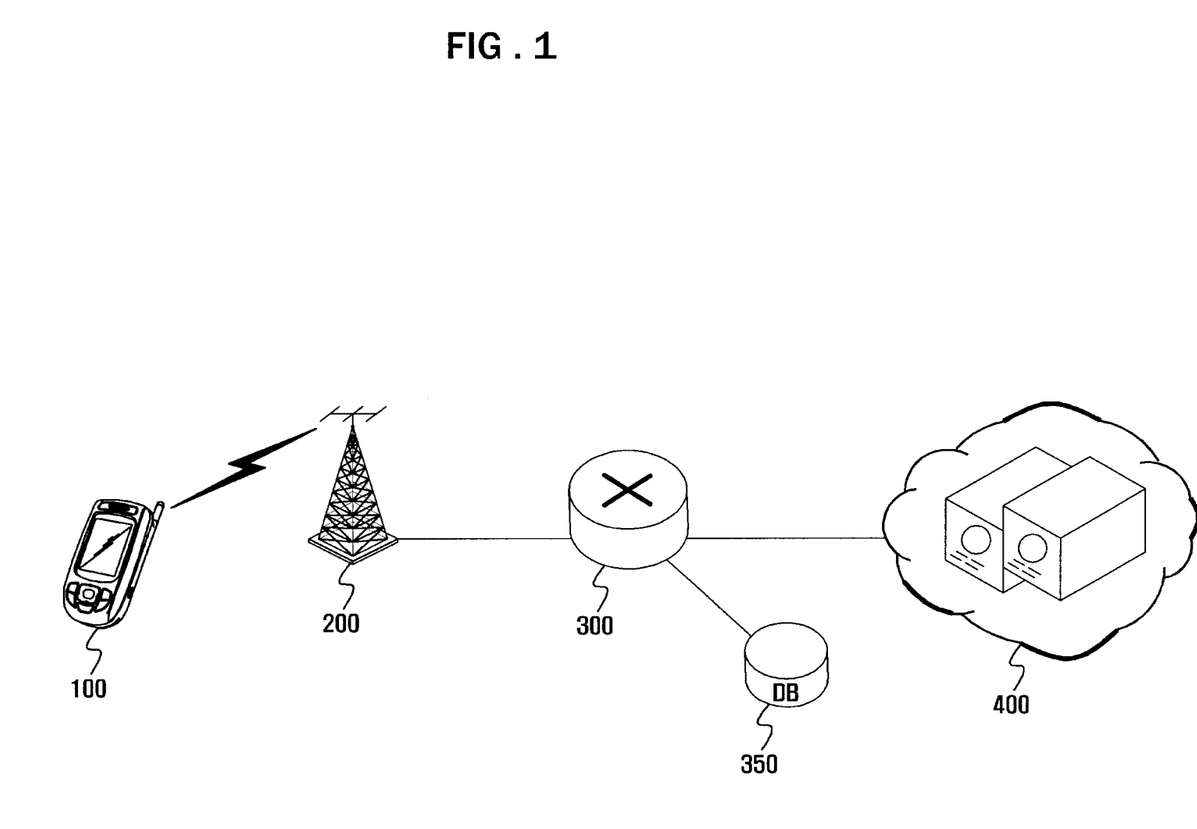
FIG. 1 is a diagram illustrating an RSS channel information provision system according to an exemplary embodiment of the present invention.

FIG. 1 is a diagram illustrating an RSS channel information provision system according to an exemplary embodiment of the present invention.

As shown in FIG. 1, the RSS channel information provision system according to an exemplary embodiment of the present invention includes a mobile terminal 100, a base station 200, a gateway 300, and a web server 400. The gateway includes a database 350.

In the above structured RSS channel information provision system, the mobile terminal 100 accesses the web server 400 via the base station 200 and the gateway 300. The mobile terminal 100 sends an RSS channel request message to the gateway 300, and the gateway 300 sends the RSS channel request message with the information about other RSS channels belonging to the same category with the requested RSS channel to the server 400. The gateway 300 receives the information regarding RSS channels classified as being in the same category as that of the RSS channel requested by the mobile terminal 100, stores the received RSS channels as being in the database 350 with the RSS channel information, and sends the information on all the RSS channels belonging to the same category indicated by the RSS channel information to the server 400.

The mobile terminal 100 connects to the web server 400 via the base station 200 according to the input manipulation of the user. In order to communicate with the web server 400, the mobile terminal 100 may be assigned an IP address by the base station 200. When the mobile terminal with the IP address is connected to the web server 400, then an RSS reader is activated in the mobile terminal 100. The mobile terminal 100 sends an RSS channel information request message to the web server 400 via the base station 200 and the gateway 300. Next, the mobile terminal 100 receives the information on the RSS channel it has requested, along with the information about RSS channels classified as being in the same category as that of the requested RSS channel. The mobile terminal 100 can be configured to display the information regarding the RSS channels and RSS channel information on its display. The structure of the mobile terminal 100 is described later with reference to FIG. 2 in detail.

The base station 200 communicates with the mobile terminal 100 and assigns an IP address to the mobile station 100 for Internet access service. The base station 200 interconnects the mobile terminal 100 and the gateway 300 and relays the signals between the mobile terminal 100 and the gateway 300. As would be recognized there may be multiple base stations deployed in a network such that their radio coverage areas are overlapped to minimize the signal shadow area. Multiple base stations can be connected to a single gateway.

The gateway 300 represents an entity that connects the base station 200 to the web server 400. Particularly in an exemplary embodiment of the present invention, the gateway 300 includes database 350 for storing the addresses of the RSS channels provided by the web server in response to the RSS channel information request. The gateway can classify the RSS channels as being in different categories according to the values contained in the RSS channel information. That is, when the mobile terminal 100 transmits a RSS channel information request message for a specific RSS channel, e.g. "yahoo news", to the web server 400, the gateway 200 receives the RSS channel information request message for "yahoo news" via the base station 200. Upon receipt of the RSS channel information request message, the gateway 300 requests the web server 400 for the information on the "news" category such that the web server 400 provides information regarding the requested RSS channel and other RSS channels belongs to the same category, e.g. news category including "KBS news", "ohmy news", "daum news", etc. as well as the requested "yahoo news." For this purpose, the gateway 300 can be configured to convert the "RSS channel information request" message transmitted by the mobile terminal 100 into an "RSS category request" message to request for the information of all RSS channels belonging to the category of the RSS channel requested by the mobile station 100. The gateway 300 sends the converted RSS category request message to the web server 400. In response to the RSS category request message, the gateway 300 receives information associated with all the RSS channels classified as being in the same category of that of the RSS channel requested by the mobile terminal 100, stores the received RSS channel information of all the RSS channels into the database 350, and sends the information on the RSS channels belonging to the category of the requested RSS channel to the mobile terminal 100. The RSS channel information provided by the web server 400 includes information on the updated news, and the channel address information includes the addresses of other RSS channels providing different news or the addresses of the RSS channels providing the updated news.

If an RSS channel information request message is transmitted after the storage of the information of the RSS channels provided by the web server 400, the gateway 300 sends the base station 200 the RSS channel information and addresses corresponding to the RSS channel indicated by the RSS channel information request message.

The web server 400 can transmit a response message carrying the RSS channel information in response to the RSS channel information request message initially sent by the mobile terminal 100. The web server 400 can also transmit a response message carrying the information on the RSS channels classified as being in the category as that of the RSS channel requested by the mobile terminal 100 in response to the RSS category request message sent by the gateway 300. In case that the RSS category request message is received, the web server 400 can collect the information on the addresses of the RSS channels classified as being in the category indicated by the RSS category request message.

As described above, the RSS channel information provision system according to an exemplary embodiment of the present invention allows the gateway 300 to request from the web server 400 information on the RSS channels classified as being in the same category as that of the RSS channel in the initially requested message transmitted by the mobile terminal and provide the mobile terminal 100 with the information on the RSS channels similar to the requested RSS channel, thereby facilitating a RSS search.

Figure 2:
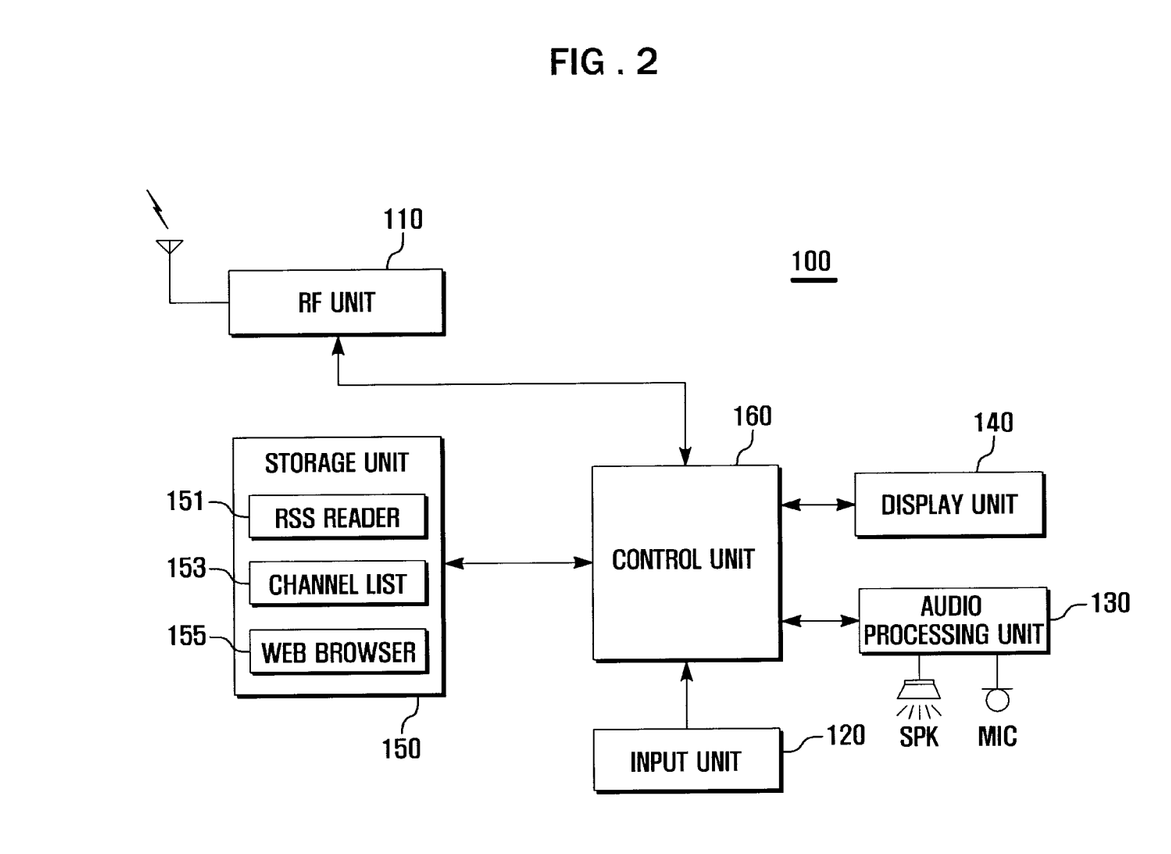
FIG. 2 is a block diagram illustrating a configuration of the mobile terminal of FIG. 1.

FIG. 2 is a block diagram illustrating an exemplary configuration of the mobile terminal of FIG. 1.

As shown in FIG. 2, the mobile terminal 100 includes a Radio Frequency unit (RF) unit 110, an input unit 120, an audio processing unit 130, a display unit 140, a storage unit 150, and a control unit 160.

The RF unit 110 is responsible for transmitting and receiving radio signal carrying voice and data including Short Message Service (SMS), Multimedia Message Service (MMS), etc. the RF unit 110 can be configured to convert the voice/audio data and control data to corresponding radio signals to be transmitted and converts the received radio signal to corresponding voice/audio data and control data. For this purpose, the RF unit 110 includes an RF transmitter for up-converting and amplifying the transmission signal and an RF receiver for low noise amplifying and down-converting the received radio frequency. Particularly in an exemplary embodiment of the present invention, the RF unit 110 establishes a communication channel with the web server via the base station 200 and the gateway 300 to transmit the RSS channel information request message to the web server 400 and receive the RSS channel information response message transmitted by the web server 400 via the gateway 300 and the base station 200. The RSS channel information response message is output to the control unit 160. The RSS channel information response message can include the information regarding the addresses of the RSS channels classified as being in the same category as that of the RSS channel indicated by the RSS channel information request message. In case that the gateway 300 does not support the aggregate channel information service, it transmits a first type RSS channel information response message including the information regarding the RSS channel requested by means of the RSS channel information response message to the mobile terminal 100. However, when the gateway 200 does support the aggregate channel information service, the gateway 200 transmits a second type RSS channel information response message including the information regarding the RSS channels classified as being in the same category as that of the RSS channel indicated by the RSS channel information request message to the mobile terminal 100.

The input unit 120 is provided with a plurality of alphanumeric keys for the user to input alphabetic and numeric data and a plurality of function keys for the user to input function configuration and execution instructions. The input unit 120 generates a signal (such as voice communication function execution signal, file selection signal, and selected file playback signal) corresponding to the user input and transfers the user input signal to the control unit 160. Particularly in an exemplary embodiment of the present invention, the input unit 120 can be configured for the user to input various RSS-related user commands (such as a web browser execution command for activating a web browser application 155 for the Internet access service, an RSS reader execution command for activating an RSS reader application 151, a RSS channel information request message transmission command, and RSS channel selection command) and transfers the signals corresponding to the user input commands to the control unit 160. Here, the RSS channel information request message transmission command can be input by the user, for example, selecting one of the items in a channel list 153 displayed on the display unit 140 according to the execution of the RSS reader 151 or entering a keyword into a text input box or a keyword input box provided by the RSS reader 151.

The audio processing unit 130 is responsible for processing an audio signal input by the control unit 160 so as to output the audio signal through a speaker (SPK) in the form of an audible sound or processing sound input through a microphone (MIC) so as to output the sound to the control unit 160 in the form of an audio signal. That is, the audio processing unit 130 converts the voice/audio signal to the audible sound wave to be output through the speaker (SPK) and converts the sound wave through the microphone (MIC) to the digital voice/audio signal under the control of the control unit 160. In an exemplary embodiment of the present invention, the audio processing unit 130 can be configured to output an alarm sound for alerting the receipt of the first type RSS channel information response message and the second type RSS channel information response message. The audio processing unit 130 also can be configured to output the audio signal contained in the RSS channels selected by the user.

The display unit 140 displays video data input under the control of the control unit 160 and user data input through the input unit 120 and supplementary function screens requested by the user. The display unit 140 can be implemented with a Liquid Crystal Display (LCD) or other types of display panels. For instance, the display unit 140 can be implemented with an Organic Light Emitting Diodes (OLED) panel or other types display devices. In an exemplary embodiment of the present invention, the display unit 140 can display an internet service option menu screen, a webpage received from the web server 400 by means of the web browser 155, an RSS reader execution screen, an RSS channel list screen, an RSS channel information request message composition screen, a first type RSS channel information response message presentation screen, a second type RSS channel information response message presentation screen, and an updated RSS channel list screen, for example. Here, the first type RSS channel information response message presentation screen and the second type RSS channel information response message presentation screen can be presented in corresponding popup windows. That is, when the first type RSS channel information response message or the second type RSS channel information response message is received, the display unit 140 can display a popup window for notifying the user of the receipt of the RSS channel information response message. The popup window can include the RSS channel information carried by the RSS channel information response message. The display unit 140 can be implemented with a touchscreen function to sense the touches thereon corresponding to click, double click, and long click events so as to execute a specific channel item selected by the touch event. The display of the RSS channel information request message composition screen can be omitted. The user interface of the display unit 140 is described in more detail with reference to FIG. 4.

The storage unit 150 stores an Operation System (OS) for booting the mobile terminal 100 and application programs related to the supplementary functions such as file playback function, camera function, and broadcast playback function (not shown). The storage unit 150 also stores the application data generated while the application programs are running in the mobile terminal, and received through the communication channel during a communication session. The storage unit 150 includes a program region and a data region (not shown).

The program region stores the application programs for supporting various supplementary functions of the mobile terminal such that the mobile terminal provides the supplementary functions by means of the application programs in response to the function executed by the user under the control of the control unit 160. In an exemplary embodiment of the present invention, the program region stores the web browser 155 for supporting the Internet access function of the mobile terminal 100 and the RSS reader 151 for supporting the RSS service. The activation of the RSS reader 151 is described in detail with reference to FIG. 4.

The data region stores the application data generated while the application programs are running in the mobile terminal 100 and the user data input by the user such as phonebook data. In an exemplary embodiment of the present invention, the data region can store the RSS channel list 153 that are loaded when the RSS reader 151 is activated. The RSS channel list 153 can be updated with the RSS channel address information received from the web server 400. The data region can be deleted by the user while the RSS reader 151 is activated.

The control unit 160 controls entire operation of the mobile terminal and signaling among the internal function blocks of the mobile terminal. The control unit 160 controls the signaling among the RF unit 110, the input unit 120, the storage unit 150, the audio processing unit 130, and the display unit 140. In an exemplary embodiment of the present invention, the control unit 160 controls the operation such that the RSS channel list is displayed in response to the activation of the RSS reader 151 and transmits the RSS channel information request message set by the user to the web server 400 via the RF unit 110. The control unit 160 also can control the operation such that the RSS reader 151 operates in conjunction with the web browser 155. That is, if the user selects an RSS item from the menu screen, the control unit 160 executes the web browser 155 along with the RSS reader 151. Once the RSS reader 151 is executed, the control unit 160 controls the operation such that the mobile terminal generates an update information request message on the channel selected by the user from the RSS channel list 153, receives the update information, i.e. the RSS channel information response message, updates the channel information with the update information carried by the response message, and displays the updated RSS channel list on the display unit 140.

Although not depicted in FIG. 2, the mobile terminal 100 can include other functional blocks for supporting diverse supplementary functions. For instance, the mobile terminal 100 can include at least one of a camera module and digital broadcast module depending on the terminal implementation.

Until now, the structures and functions of the mobile terminal for supporting the RSS channel information provision method and system according to an exemplary embodiment of the present invention have been described. The operations of the mobile terminal, gateway, and web server for the RSS channel information provision method are next described.

Figure 3:
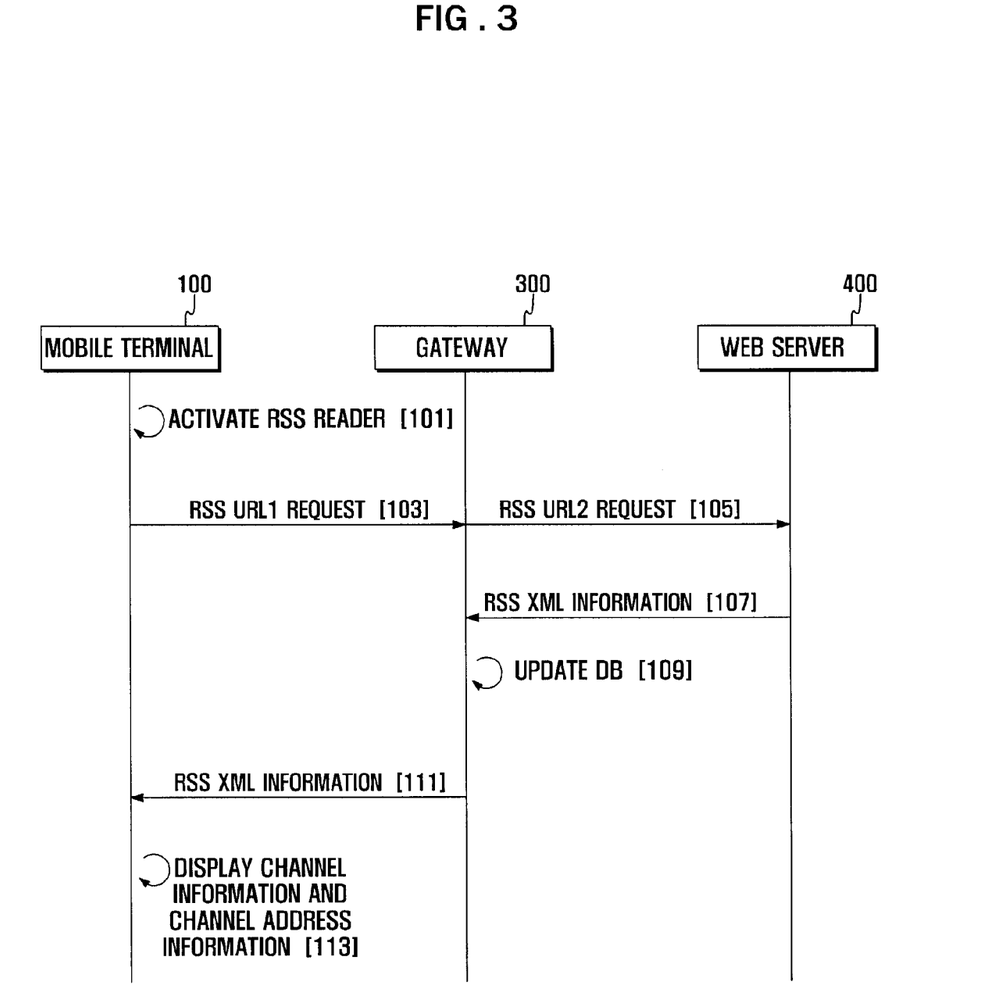
FIG. 3 is a sequence diagram illustrating operations of the mobile terminal, gateway, and web server for the RSS channel information provision method according to an exemplary embodiment of the present invention.

FIG. 3 is a sequence diagram illustrating operations of the mobile terminal, gateway, and web server for the RSS channel information provision method according to an exemplary embodiment of the present invention.

Referring to FIG. 3, first the mobile terminal 100 activates the RSS reader 151 in response to a user command input through the input unit 120 (101). Once the RSS reader 151 is activated, the mobile terminal 100 establishes a communication channel with the web server 400.

Next, the mobile terminal 100 generates a first type RSS channel information request message (RSS URL1) in response to a user command input through the input unit 120 and sends the first type RSS channel information request message (RSS URL1) to the gateway 300 via the base station 200 (103). The mobile terminal 100 can control the display unit 140 to display a channel list (153) for the user to select an RSS channel or display a text input box or a keyword input box for the user to enter a keyword while the RSS reader is activated. The user can enter the name of a website (e.g. yahoo news) into the text or keyword input box or select a channel item from the RSS channel list. If a website name is entered into the text or keyword input box or a channel item is selected from the RSS channel list, the mobile terminal sends the first type RSS channel information request message (RSS URL1) including the website name (e.g. yahoo news) to the gateway 300.

Upon receipt of the first type RSS channel information request message, the gateway 300 generates a second type RSS channel information request message (RSS URL2) for requesting the information on additional RSS channels classified as being in a same category as that of the RSS channel (e.g. yahoo news) indicated by the first type RSS channel information request message. The gateway 300 sends the second type RSS channel information request message (RSS URL2) to the web server 400 (105).

Upon receipt of the second type RSS channel information request message (RSS URL2), the web server 400 generates an RSS channel information response message (RSS xml) and sends the RSS channel information response message (RSS xml) back to the gateway 300 in response to the second RSS channel information request message (RSS URL2) (107). The RSS channel information response message (RSS xml) is composed, in the xml format, includes a first type RSS channel information region for containing the RSS channel information corresponding to the first type RSS channel information request message (RSS URL1) and a second type RSS channel information region for containing the RSS channel information corresponding to the second type RSS channel information request message (RSS URL2). For instance, the RSS channel information response message (RSS xml) can be formatted as following:

---

[first type RSS channel information region of RSS channel information response message]
    <?xml version = "1.0"?>
    <rss version = "2.0">
    <channel>
    <title>Liftoff News</title>
    <link>http://liftoff.msfc.nasa.gov/</link>
    <description>Liftoff to Space Exploration</description>
    <item>
    <title>Star City</title>
    <link>http://liftoff.msfc.nasa.gov/news/2003/news-starcity/asp</link>
    <description>content...</description>
    <pubDate>Tue,03 Jun 2003 09:39:21 GMT</pubDate>
    <guid>http://liftoff.msfc.nasa.gov/2004/06/03.html#item573</guid>
    </item>
    </channel>
[second type RSS channel information region of RSS channel information response message]
    <relatedChannel>
    <title>Related News</title>
    <link>.relatednews.com/</link>
    <description>This is a related News.</description>
    </relatedChannel>

---

After the RSS channel information response message (RSS xml) is received, the gateway 300 updates the database 350 (109). The second RSS channel information region can be added to the xml document by the gateway 300 after the database 350 is updated. That is, if the first type RSS channel information request message (RSS URL1) is received from the mobile terminal 100 after update of the data base 350 with the RSS channel information received from the web server 400, the gateway 300 can generate the RSS channel information response message with the RSS channels classified as being in the same category as that of the RSS channel indicated by the first type RSS channel information request message (RSS URL1) by itself and sends the RSS channel information response message to the mobile terminal 100 in response to the first type RSS channel information request message (RSS URL1).

Once the database 350 is completely updated, the gateway 300 sends the RSS channel information response message (RSS xml) to the mobile terminal 100 (111). Upon receipt of the RSS channel information response message (RSS xml), the mobile terminal 100 displays the RSS channel information carried by the RSS channel information response message (RSS xml) on the display screen (113). At this time, it can be controlled such that the address information of the RSS channels classified into the same category as that of the RSS channel requested by the mobile terminal 100 can be displayed in the form of a popup window.

A user interface of the display unit 140 for providing the RSS channel information is described with reference to FIG. 4.

Figure 4:
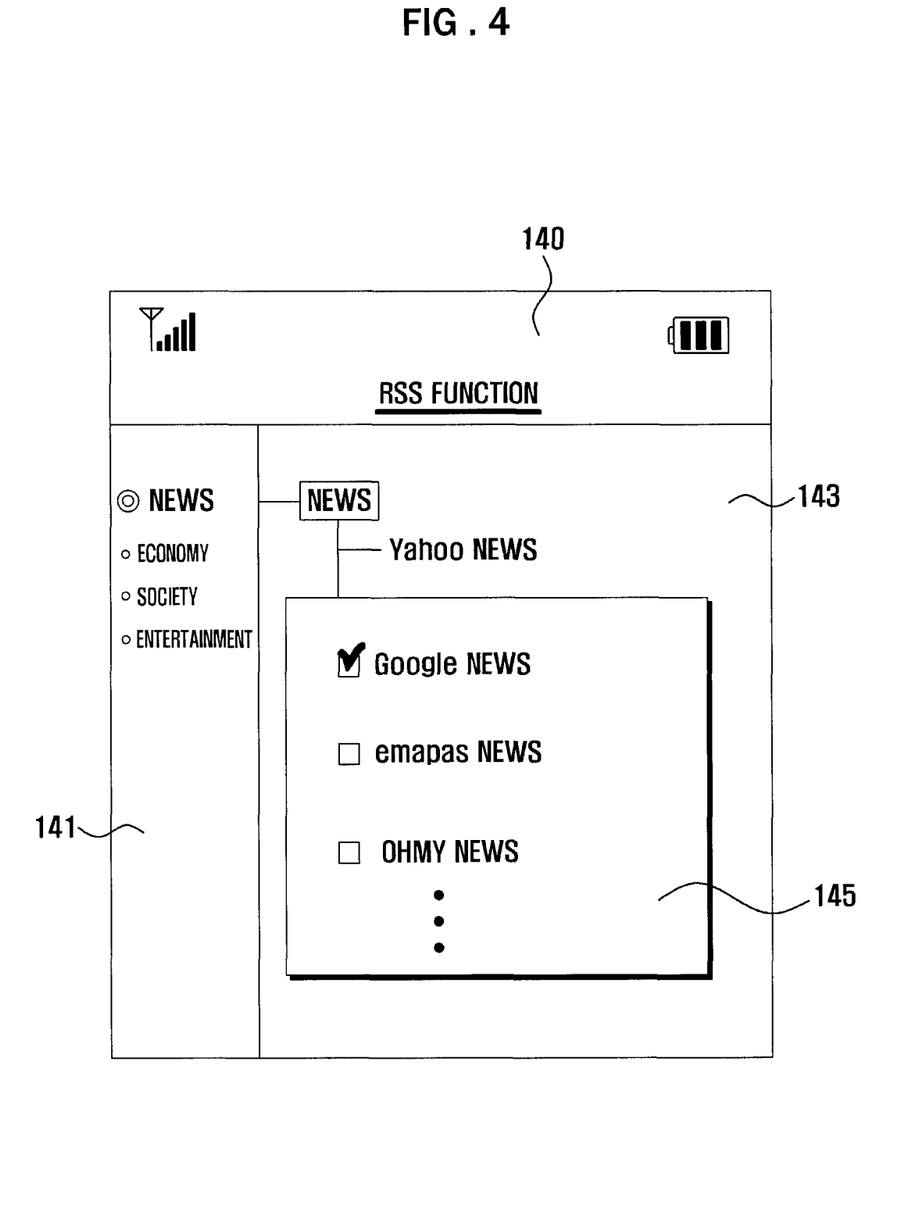
FIG. 4 is a diagram illustrating a screen image of a user interface for providing the RSS channel information according to an exemplary embodiment of the present invention.

FIG. 4 is a diagram illustrating an exemplary screen image of a user interface for providing the RSS channel information according to an exemplary embodiment of the present invention.

Referring to FIG. 4, an RSS channel information display screen includes a category region 141, a RSS channel information region 143, and a popup window region 145 presenting the RSS channel information that is displayed when the RSS channel information response message is received from the gateway 300.

The category region 141 displays category items set by the user. Each category is used as a criterion to classify the RSS channels. In case that the display unit 140 is implemented with the touchscreen function, the user can select one of the category items by touching the display screen on the category item. The category item selection can be made by navigating a cursor on the screen using navigation keys of the input unit 120 or clicking a key mapped to a number assigned to the target category item. In FIG. 4, the description is made in an exemplary case that the "news" category item is selected.

The channel information region 143 displays a list of the RSS channels classified into the category corresponding to the item selected in the category region 141. For instance, if the "news" item is selected in the category region 141, the channel information region 143 displays a list of the RSS channels (e.g. yahoo news) classified into the news category. If the user selects one (e.g. yahoo news) of the RSS channels from the list displayed in the channel information region 143, the mobile terminal 100 generates the RSS channel information request message including the name of the yahoo news and sends the RSS channel information request message to the web server 400 via the base station 200 and the gateway 300. When the RSS channel information request message is received, the web server 400 generates an RSS channel information response message with the information on the update of the yahoo news and sends the RSS channel information response message to the mobile terminal 100. In order for the web server 400 to check the update of the requested RSS channel, the RSS channel information request message can include the version information of the requested RSS channel (e.g. yahoo news) and/or the weather information that has been previously stored. When the RSS channel information request message for the yahoo news is received, the web server 400 can generate the RSS channel information response message with the information on the addresses of the RSS channels (e.g. Google news, empas news, and ohmy news) classified as being in the news category as the yahoo news and sends the RSS channel information response message to the gateway 300. In order to request the web server 400 for the information about the RSS channels classified as being in the news category, the gateway 300 converts the RSS channel information request message received from the mobile terminal 100 into a category information request message and sends the converted category information request message to the web server 400.

If the RSS channel information response message containing the information regarding the addresses of the RSS channels classified as being in the category as that of the requested RSS channel, the mobile terminal 100 displays the information on the requested RSS channel (e.g. yahoo news) extracted from the RSS channel information response message. The mobile terminal 100 also can display the information associated with the addresses of the RSS channels classified as being in the same category as that of the requested RSS channel in the form of a popup window 155.

Using channel address information popup window 155, the mobile terminal 100 provides the user with the information regarding the addresses of the RSS channels (e.g. google news, empas news, and ohmy news) classified as being in the same category (e.g. news category) as that of the requested RSS channel (e.g. yahoo news). The RSS channel addresses of the same category can be displayed with check mark boxes such that the user can select at least one of the RSS channels listed in the popup window 155. The user can add the RSS channels displayed in the channel address information popup window 155 to the RSS channel list by marking a check box corresponding to the intended channel address.

As described above, the RSS channel information provision method according to an exemplary embodiment of the present invention allows a gateway to collect the information on the RSS channels classified as being in the same category as that of the RSS channel requested by the mobile terminal and provides the user with the information regarding these channels.

Figure 5:
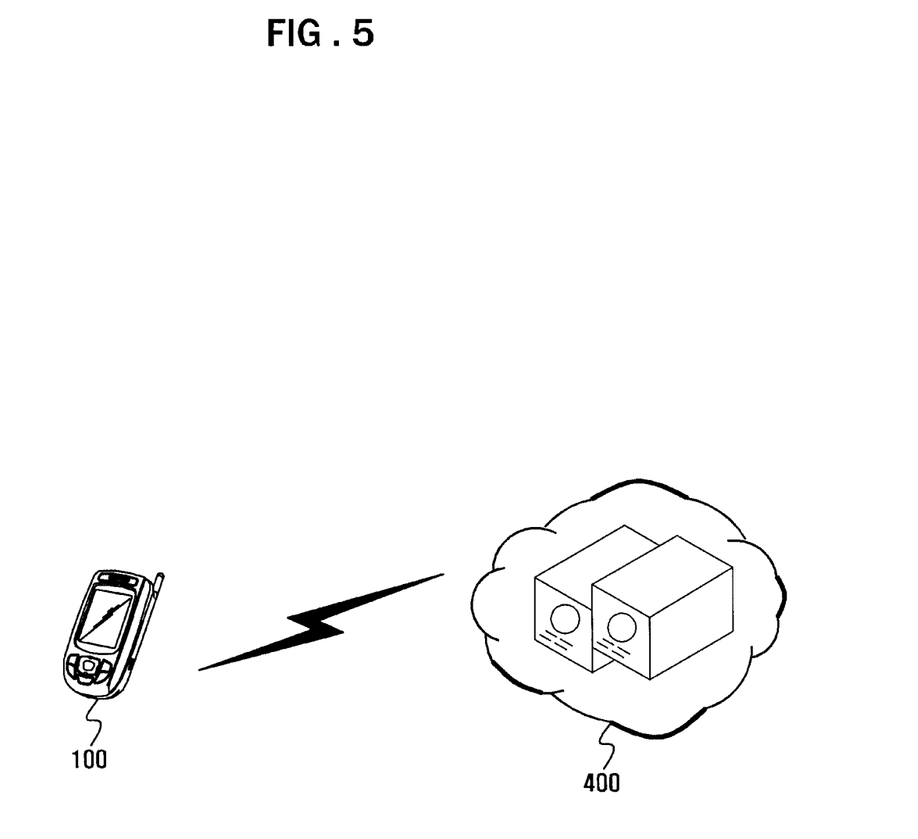
FIG. 5 is a diagram illustrating an RSS channel information provision system according to another exemplary embodiment of the present invention.

FIG. 5 is a diagram illustrating an RSS channel information provision system according to another exemplary embodiment of the present invention.

As shown in FIG. 5, the RSS channel information provision system according to an exemplary embodiment of the present invention includes a mobile terminal 100 and a web server 400. The RSS channel information provision system can further include a base station (not shown) that connects the mobile terminal 100 to the web server 400.

The mobile terminal 100 accesses the web server 400 by means of a web browser and sends an RSS channel information request message to the web server 400. The RSS channel information request message can include the information on the target RSS channel and a category of the target RSS for requesting the information on the RSS channels classified as being in the category as that of the target RSS as well as the target RSS channel. When the RSS channel information request message is received, the web server 400 generates an RSS channel information response message containing the addresses of the RSS channels classified as being in the category indicated by the RSS channel information request message along with the information regarding the target RSS channel and sends the RSS channel information response message to the mobile terminal 100. Upon receipt of the RSS channel information response message, the mobile terminal 100 displays the RSS channel information contained in the RSS channel information response message in the RSS channel information region of the RSS channel information display screen and the channel address information in a channel address information popup window. The mobile terminal 100 also stores the received RSS channel address information in the storage unit 151.

That is, the mobile terminal 100 sends the web server 400 an RSS channel information request message to request the information on the addresses of the RSS channels classified as being in the same category as that of the target RSS channel as well as the information on the target RSS channel, and the web server 400 sends the mobile terminal 100 an RSS channel information response message containing the information regarding the addresses of the RSS channels classified as being in the same category as that of the target RSS channel and the requested information regarding the target RSS channel. Accordingly, the mobile terminal 100 can provide the user with the information on address of the RSS channels classified as being in the same category as that of the target RSS channel along with the target RSS channel information. Thus, negating additional user manipulation to search for other RSS channels classified into the same category. The mobile terminal 100 can be configured to provide a menu item or a configuration option for activating the per-category RSS channel request function such that the per-category RSS channel request function is activated by a user selection.

Figure 6:
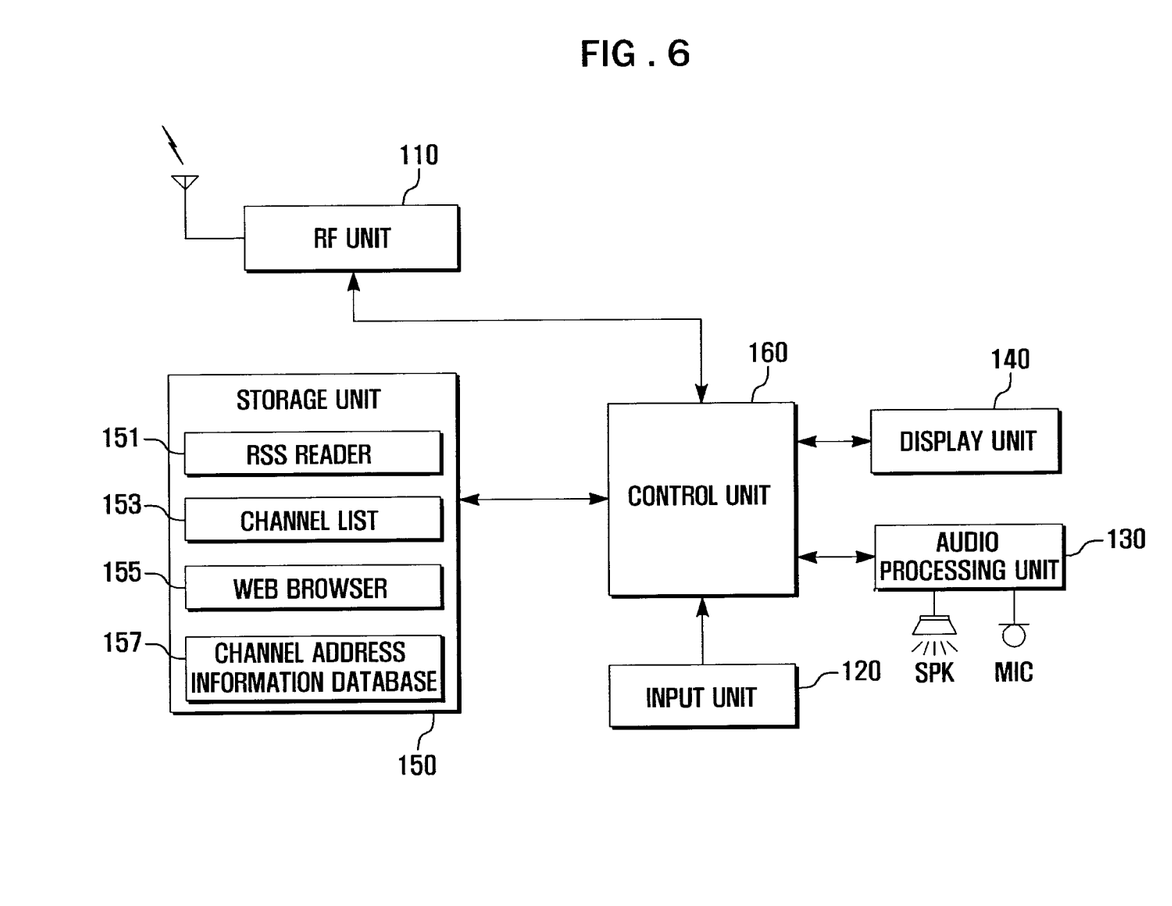
FIG. 6 is a block diagram illustrating a configuration of a mobile terminal for supporting the RSS channel information provision method according to another exemplary embodiment of the present invention.

FIG. 6 is a block diagram illustrating a configuration of a mobile terminal for supporting the RSS channel information provision method according to another exemplary embodiment of the present invention.

As shown in FIG. 6, the mobile terminal includes an RF unit 110, and input unit 120, an audio processing unit 130, a display unit 140, a storage unit 150, and a control unit 160. Since the structure of the mobile terminal according to the embodiment of FIG. 6 is identical with that of the mobile terminal according to the embodiment of FIG. 2 except that the storage unit 150 includes a channel address information database, detailed descriptions on the internal function blocks of the mobile terminal are omitted.

The RF unit 110 is responsible for transmitting a radio signal carrying the RSS channel information request message to the web server 400 under the control of the control unit 160 and receiving a radio signal carrying the RSS channel information response message transmitted by the web server 400. The RSS channel information request message can be one of a target RSS channel information request message to request for the information on a target RSS channel and a category-specific RSS channel information request message to request information regarding RSS channels classified into the same category as that of the target RSS channel. Depending on the type of the RSS channel information request message, the RSS channel response message sent by the web server 400 can be one of a target RSS channel information response message containing only the target RSS channel information and a category specific RSS channel information response message containing the information regarding the RSS channels classified as be in the same category as that of the target RSS channel.

The storage unit 150 stores an RSS reader 151 for supporting the RSS service, an RSS channel list 153 for providing RSS channel information, a web browser 155 for accessing the web server, and a channel address information database 157. Since the RSS reader 151, RSS channel list 153, and web browser 155 are identical with those in the embodiment of FIG. 2, detailed information about them is omitted. The channel address information database 157 stores the RSS channel address information carried by the RSS channel information response message transmitted by the web server 400. The mobile terminal stores the RSS channel address information in the storage unit 150 and provides the control unit 160 with the stored RSS channel address information when the user request the channel information on one of the channel addresses stored in the channel address information database 157.

The control unit 160 controls signaling among the internal function blocks of the mobile terminal, particularly, the signaling for the RSS channel information acquisition. The control unit 160 also controls updating and load the channel address information database 157. When the RSS channel information response message is received the control unit 160 of the mobile terminal extracts the RSS channel information and RSS channel address information. Next, the control unit 160 controls the operation such that the RSS channel information is displayed in a specific region of the channel information display screen, i.e. the RSS channel information region 143. The control unit 160 also controls the operation such that the extracted RSS channel address information is stored into the channel address information database 157 and displayed in a specific region of the channel information display screen, i.e. the channel address information popup window 155. If the user selects at least one of the RSS channel addresses displayed in the channel address information popup window 155, the control unit 160 registers the selected RSS channel to the RSS channel list displayed in the channel information region 143. If the user requests information regarding a specific RSS channel after the update of the RSS channel list, the control unit 160 checks whether the RSS channel exists in the database 157. If the RSS channel exists in the data base 157, the control unit 160 sends a targeted RSS channel information request message to request the web server 400 for transmission of the information on the target RSS channel. After the RSS channel information response message is received, in response to the target RSS channel information request message, the control unit 160 of the mobile terminal controls the operation such that the received RSS channel information is displayed on the display unit 140 and the RSS channel address information stored in the database 157 is displayed in the form of a channel address information popup window.

As described above, the RSS channel information provision system according to an exemplary embodiment of the present invention allows the mobile terminal to send different types of RSS channel information request messages, i.e. a target RSS channel information message and a category-specific RSS channel information request message, thereby facilitating provision of the RSS channel information and the RSS channel address information.

Figure 7:
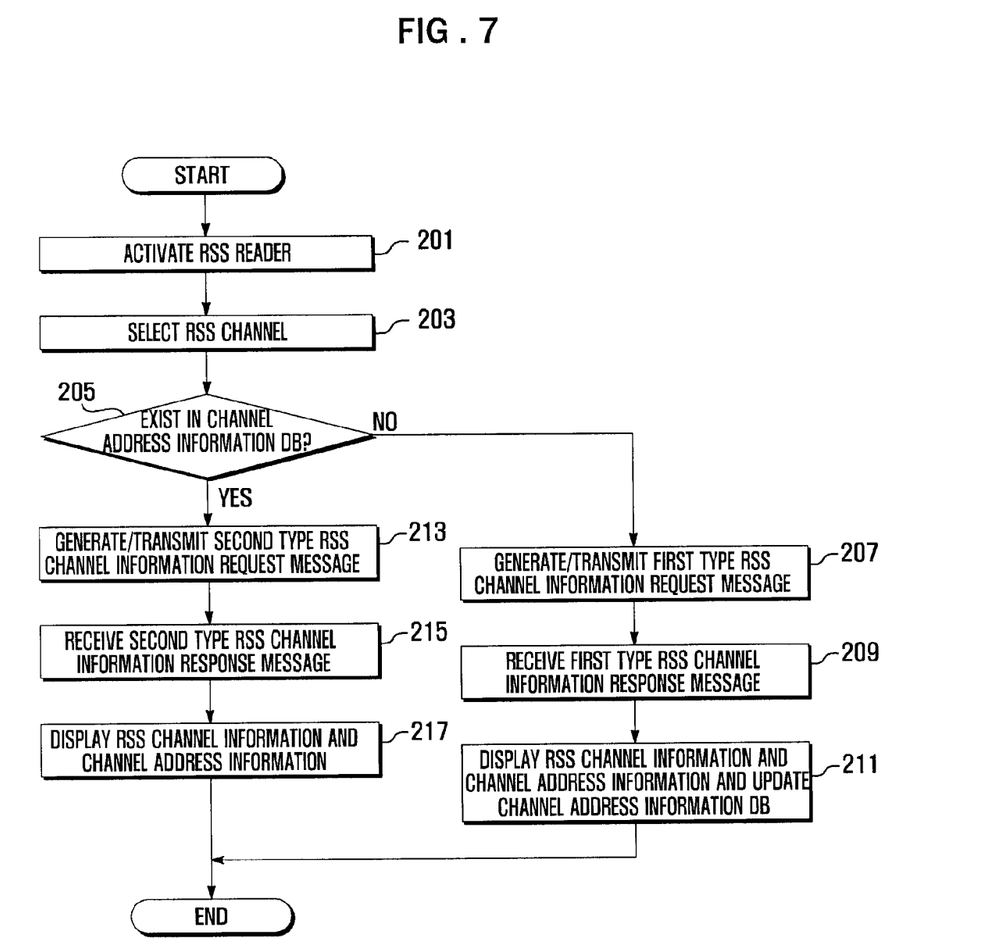
FIG. 7 is a flowchart illustrating an RSS channel information provision system according to an exemplary embodiment of the present invention.

FIG. 7 is a flowchart illustrating an RSS channel information provision system according to an exemplary embodiment of the present invention without using a gateway 300. In the following description, it is assumed that the mobile terminal operates in a category-specific RSS channel information provision mode in which an aforementioned category-specific RSS channel information request message is transmitted to the web server.

Referring to FIG. 7, the control unit 160 of the mobile terminal executes the RSS reader 151 stored in the storage unit 150 in response to the user command input through the input unit 120 (201). In case that the RSS reader 151 is working with the web browser 155, the control unit 160 executes the web browser 155 first to access the web server 400 and then activates the RSS reader 151 with the display of the execution screen on the display unit 140. Once the RSS reader is activated, the RSS channel list is displayed on the display screen.

While the RSS channel list is displayed on the display screen, the user selects an RSS channel from the RSS channel list by providing an input through the input unit 120 (203). After an RSS channel is selected by the user, the control unit 160 determines whether the selected RSS channel exists in the channel address information database (205). Although the description is made with the case where the RSS channel is selected from the RSS channel list, it is possible for the user to select an RSS channel by entering an RSS channel name or a keyword into a search input box or a keyword box provided by the RSS reader, as was previously discussed.

If the RSS channel selected by the user does not exist in the channel address information database at step 105, the control unit 160 generates a first type RSS channel information request message and transmits the first type RSS channel information request message to the web server 400 (207). The first type RSS channel information request message is configured to request from the web server information on the addresses of the RSS channels classified as being within a same category as that of the non-existent RSS channel selected by the user. An embodiment with regard to FIG. 3 is different from an embodiment with regard to FIG. 7. In response to the first type RSS channel information request message, the control unit 160 receives a first type RSS channel information response message from the web server 400 (209). Upon receipt of the first type RSS channel information response message, the control unit 160 extracts the RSS channel information and the RSS channel address information from the first type RSS channel information response message, displays the RSS channel information in a RSS channel information region of the display screen and the RSS channel address information in the form of a popup window, and updates the channel address information database 157 with the RSS channel address information (211).

If the RSS channel selected by the user exists in the channel address information database at step 105, the control unit 160 generates a second type RSS channel information request message and sends the second type RSS channel information request message to the web server 400 (213). The second type RSS channel information request message is configured to request from the web server 400 information on only the RSS channel selected by the user. In response to the second type RSS channel information request message, the control unit 160 receives a second type RSS channel information response message from the web server 400 (215). Upon receipt of the second type RSS channel information response message, the control unit 160 extracts the RSS channel information from the second type RSS channel information response message, displays the extracted RSS channel information on the display screen along with the RSS channel address information stored in the channel address information database 157 (217). At this time, the RSS channel address information can be displayed in the form of a popup window.

As described above, the RSS channel information provision method and system and mobile terminal using the same according to the present invention provides the user with an RSS channel list having recommended RSS channels, thereby facilitating access to a target RSS channel and acquisition of related RSS channel information.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A Rich Site Summary (RSS) channel information provision method in a gateway comprising:
   receiving a first type RSS channel information request message requesting information on a selected RSS channel from a mobile terminal;
   searching a database for addresses of other RSS channels having a category classified as being in a same category as the selected RSS channel;
   transmitting, when no address of other RSS channels is found, a second type RSS channel information request message, which requests information of the selected RSS channel and RSS channels belonging to a category of the selected RSS channel, to a web server;
   receiving, in response to the second type RSS channel information request message, a first RSS channel information response message containing information regarding the selected RSS channel and addresses of other RSS channels classified as being in the same category as that of the selected RSS channel from the server;
   transmitting the first RSS channel information response message to the mobile terminal;
   when at least one address of the other RSS channels is found, transmitting the first type RSS channel information request message to the web server, receiving, in response to the first type RSS channel information request message, a second RSS channel information response message containing only the information on the selected RSS channel from the server; and
   transmitting the second RSS channel information response message with the information on the other RSS channels included in the database to the mobile terminal.

2. The RSS channel information provision method of claim 1, wherein the first or second RSS channel information response message is used, at the mobile terminal, for displaying the information on the selected RSS channel at a RSS channel information region of the mobile terminal and information on the addresses of the other RSS channels at a different region from the RSS channel information region.

3. The RSS channel information provision method of claim 1, further comprising at least one of storing the addresses of the other RSS channels contained in the RSS channel information response message received from the web server; and wherein the at least one of the other RSS channels is used for registering, at the mobile terminal, at least one of the other RSS channels with an RSS channel list in response to a user selection command.

4. A Rich Site Summary (RSS) channel information provision method in a mobile terminal, comprising:
   selecting a RSS channel;
   determining whether addresses of other RSS channels having a category classified as being in a same category as the selected RSS channel is included in a channel address information database at the mobile terminal;
   transmitting, when addresses of the other channels are not included in the channel address information database, a first type RSS channel information request message requesting information on the selected RSS channel and addresses of other RSS channels classified as being in the same category as that of the selected RSS channel to a web server;
   receiving a first type RSS channel information response message responsive to the first type RSS channel information request message, containing information regarding the selected RSS channel and the addresses of the other RSS channels from the web server;
   displaying the information on the selected RSS channel and the addresses of the other RSS channels based on the first type RSS channel information response message;
   when the addresses of the other channels are included in the channel address information database,
   transmitting a second type RSS channel information request message only requesting information on the selected RSS channel to the web server;
   receiving from the web server, in response to the second type RSS channel request message, a second type RSS channel information response message containing information on the selected RSS channel; and
   displaying the information on the selected RSS channel based on the second type RSS channel information response message and addresses of the other RSS channels included in the channel address information database.

5. The RSS channel information provision method of claim 4, further comprising registering the address of at least one of the other RSS channels in an RSS channel list in response to a user command.

6. The RSS channel information provision method of claim 4, wherein the displaying information comprises, displaying information on the selected RSS channel at a RSS channel information region and the information on the addresses of the other RSS channels at a different region from the RSS channel information region.

7. The RSS channel information provision method of claim 4, further comprising:
   displaying addresses of the other RSS channels classified as being in the same category as the selected RSS channel that are stored in the channel address information database; and
   registering at least one of the addresses in an RSS channel list in response to a user command.

8. The RSS channel information provision method of claim 4, wherein selecting an RSS channel comprises at least one of: selecting one of the RSS channels from an RSS channel list in response to a user command and receiving an RSS channel input through a text input box or a keyword search box.

9. A Rich Site Summary (RSS) channel information provision system comprising:
   a mobile terminal which transmits a first type RSS channel information request message requesting information regarding a selected RSS channel;
   a gateway which receives the first type RSS channel information request message, searches a database for addresses of other RSS channels classified as being in the same category as the selected RSS channel, and transmits, when no address of other RSS channels is found in the database, a second type RSS channel information request message requesting the information on the selected RSS channel and the addresses of the other RSS channels; and a web server which receives the second type RSS channel information request message and transmits an RSS channel information response message to the gateway, the RSS channel information response message containing the information on the selected RSS channel and the addresses of the other RSS channels classified as being in the same category as that of the selected RSS channel, wherein the gateway forwards the RSS channel information response message to the mobile terminal, and wherein the mobile terminal displays the information on the selected RSS channel and the address of the other RSS channels extracted from the RSS channel information response message;

wherein the gateway transmits, when addresses of other RSS channels are found in the database, the first type RSS channel information request message requesting the information on the selected RSS channel, receives the RSS channel information response message containing the information on the selected RSS channel, and transmits the RSS channel information response message with the addresses of other RSS channels to the mobile terminal.

10. The RSS channel information provision system of claim 9, wherein the database stores the addresses of the other RSS channels carried by the RSS channel information response message transmitted by the web server.

11. The RSS channel information provision system of claim 9, wherein the mobile terminal displays the information further comprises displaying the information on the selected RSS channel at a RSS channel information region and the information on the address of the other RSS channels at a different region from the RSS channel information region.

12. The RSS channel information provision system of claim 10, wherein the mobile terminal registers at least one of the addresses of the other RSS channels in an RSS channel list in response to a user command.

13. A mobile terminal comprising:
a storage unit which stores a web browser, a Rich Site Summary (RSS) reader for supporting RSS services, an RSS channel list, and an RSS channel address information database;
a display unit which displays an execution screen of the RSS reader and the RSS channel list;
an input unit which generates an input signal for selecting an RSS channel; a radio frequency unit which communicate data with other network nodes; and
a control unit which creates, when addresses of other RSS channels having a category classified as being in a same category as the selected RSS channel is included in the channel address information database, a first type RSS channel information request message requesting information on a selected RSS channel and addresses of other RSS channels classified as being in the same category as that of the selected RSS channel, receives, in response to the first type RSS channel request message, a first type RSS channel information response message from a web server, and displays, based on the first type RSS channel information response message, the information regarding the selected channel at a RSS channel information region and the information regarding the addresses of the other RSS channels at a different region from the RSS channel information region, wherein the control unit further creates, when the addresses of the other channels are included in the channel address information database, a second RSS channel information request message requesting only information on the selected RSS channel to the web server, receives from the web server, in response to the second RSS channel request message, a second RSS channel information response message containing information on the selected RSS channel and displays the information on the selected channel based on the second RSS channel information response message and addresses of the other RSS channel included in the channel address information database on the display unit.

14. The mobile terminal of claim 13, wherein the control unit extracts, when the first RSS channel information response message is received in response to the first type RSS channel information request message, the information regarding the selected channel and the addresses of the other RSS channels from the first type RSS channel information response message.

15. The mobile terminal of claim 13, wherein the control unit registers at least one of the addresses of the other RSS channels in the RSS channel list in response to a user command input through the input unit.

16. The mobile terminal of claim 13, wherein the control unit extracts, when a second type RSS channel information response message in response to the second type RSS channel information request message is received, information on the selected channel from the second type RSS channel information response message and displays the extracted information on the selected channel on the display unit.

17. The mobile terminal of claim 16, wherein the control unit retrieves addresses of other RSS channels classified as being in the same RSS channel as that of the selected RSS channel from the channel address information database and displays the addresses of the other RSS channels on the display unit.

18. The mobile terminal of claim 13, wherein the display unit displays a channel information display screen comprising:
a channel information region for displaying the RSS channel list; and
at least one of a text input unit for inputting an RSS channel name and a search box for inputting a keyword for RSS channel search.

19. A Rich Site Summary (RSS) channel information provision method in a mobile terminal, comprising:
selecting a RSS channel;
transmitting a RSS channel information request message requesting information on the selected RSS channel to a gateway; and
receiving a channel information response message including RSS channel information corresponding to the selected RSS channel and addresses of other RSS channels classified as being in the same category as that of the selected RSS channel from the gateway, wherein the gateway determines whether the addresses of other RSS channels are included in the database, when the addresses of other RSS channels are included in the database, transmits a first type RSS channel information request message requesting information on the selected RSS channel to a server, receives, in response to the first type RSS channel information request message, a second type RSS channel information response message including only information on the selected RSS channel from the server, and transmits the second type RSS channel information response message with the information on the addresses of other RSS channels included in the database to the mobile terminal, when the addresses of other RSS channels are not included in the database, transmits a second type RSS channel information request message requesting information on the selected RSS channel and the addresses of other RSS channels to the server, receives, in response to the second type RSS channel information request message, a first type RSS channel information response message including information on the selected RSS channel and addresses of other RSS channels from the server, and transmits the received first type RSS channel information response message to the terminal.

20. A mobile terminal comprising:
a radio frequency unit which communicate data with other network nodes; and
a controller configured to controlling to transmit a RSS channel information request message requesting information on the selected RSS channel to a gateway, to receive a channel information response message including RSS channel information corresponding to the selected RSS channel and addresses of other RSS channels classified as being in the same category as that of the selected RSS channel from the gateway, wherein the gateway determines whether the addresses of other RSS channels are included in the database, when the addresses of other RSS channels are included in the database, transmits a first type RSS channel information request message requesting information on the selected RSS channel to a server, receives, in response to the first type RSS channel information request message, a second type RSS channel information response message including only information on the selected RSS channel from the server, and transmits the second type RSS channel information response message with the information on the addresses of other RSS channels included in the database to the mobile terminal, when the addresses of other RSS channels are not included in the database, transmits a second type RSS channel information request message requesting information on the selected RSS channel and the addresses of other RSS channels to the server, receives, in response to the second type RSS channel information request message, a first type RSS channel information response message including information on the selected RSS channel and addresses of other RSS channels from the server, and transmits the received first type RSS channel information response message to the terminal.

* * * * *